United States Patent [19]

Kuklina et al.

[11] 3,950,507

[45] Apr. 13, 1976

[54] METHOD FOR PRODUCING GRANULATED POROUS CORUNDUM

[76] Inventors: Georgy Konstantinovich Boreskov, ulitsa Zolotodolinskaya, 85; Valentina Nikclaevna Kuklina, bulvar Molodezhi, 28a, kv. 33; Emmanuil Aronovich Levitsky, ulitsa Akademicheskaya, 6, kv. 42; Boris Nikolaevich Badaev, ulitsa Rossiiskaya, 26, kv. 19; Vladimir Alexandrovich Balashov, KsM, 45, kv. 1, all of Novosibirsk, U.S.S.R.

[22] Filed: Mar. 19, 1974

[21] Appl. No.: 453,004

[52] U.S. Cl. .............. 423/626; 423/628; 423/625; 432/18
[51] Int. Cl.$^2$ ............................................ C01F 7/02
[58] Field of Search ...... 423/625, 626, 628; 432/18, 432/23

[56] References Cited
UNITED STATES PATENTS

| | | | |
|---|---|---|---|
| 1,777,570 | 10/1930 | Masin | 423/626 |
| 2,411,806 | 11/1940 | Riesmeyer et al. | 423/626 |
| 2,833,622 | 5/1958 | Roberts et al. | 423/625 X |
| 2,887,361 | 5/1959 | Fenerty | 423/625 X |
| 3,265,465 | 8/1966 | Turpin | 423/625 X |
| 3,370,017 | 2/1968 | Bergna et al. | 423/625 |
| 3,402,024 | 9/1968 | Marshall et al. | 423/625 |

*Primary Examiner*—Herbert T. Carter
*Attorney, Agent, or Firm*—Haseltine, Lake & Waters

[57] ABSTRACT

The invention relates to a method for producing granulated porous corundum having a homogeneous porous structure with a total pore volume of 0.3 to 1.0 cm$^3$/g and predominant pore size of 5000 to 30000 A. The method comprises subjecting the granules of active alumina or aluminum hydroxide having a porous structure with a total pore volume of 0.3 to 1.0 cm$^3$/g and pore size of 20 to 5000 A to heat treatment by increasing the temperature from 20°C to 700°C during a period of at least 0.5 hour, thereafter the granules are heat treated at a temperature range of from 700°C to 1000°C for at least 0.5 hour, and then at a temperature range of from 1000°C to 1400°C for at least 0.5 hour, the heat treatment in the temperature range of from 20°C to 1000°C being carried out in an atmosphere of hydrogen fluoride which is present in amounts of from 0.01 to 2.0 percent of the weight of active alumina. The method of the invention can be effected by carrying out the heat treatment either in a stationary mode, or by a combination of stationary and continuous modes, or in a purely continuous mode. The method permits the use of initial granules of active alumina or aluminum hydroxide having any pore size distribution within the above-specified range; it also prevents the sintering of initial granules when heat treated, thus preventing any decrease in the total pore volume and linear dimensions of the granules and yields a granulated porous corundum having high mechanical strength (crushing strength of up to 160 kg/cm$^2$). The method requires no sophisticated technology or equipment.

15 Claims, No Drawings

METHOD FOR PRODUCING GRANULATED POROUS CORUNDUM

The present invention relates to methods for producing solid porous materials and more particularly to a method for producing porous corundum comprising α-alumina granules having a homogeneous porous structure with a total pore volume of 0.3 to 1.0 cm$^3$/g and predominant pore size of 5000 to 30000 A. Granulated porous corundum is used as a catalyst carrier as well as a material for heat insulation, heat carrier, inert matrices in chromatography or insulating refractory linings.

Known in the art is a method for producing granulated porous corundum having both heterogeneous and homogeneous porous structure with a total pore volume exceeding 0.2 cm$^3$/g, preferably 0.6 cm$^3$/g and a predominant pore size from 1500 to 50000 A, by way of precipitating an alumina gel at a pH of 7.5 to 11, followed by aging the gel, drying, washing and shaping thereof into granules. The granules thus produced have a total pore volume of more than 0.2 cm$^3$/g, the predominant macropore size being 1500 to 50000 A and micropores — under 1500 A. The grains thus produced are calcinated at a temperature of 1500° to 1800° C.

The disadvantages inherent in the above-described method are as follows:

1. The need of preparing an alumina gel which must have large pores with a predominant pore size of 1500 to 50000 A, the total volume of said pores exceeding 0.2 cm$^3$/g, in order to obtain granulated corundum with the required pore distribution.
2. Reduction of the total pore volume as well as reduction of the linear dimensions of the granules (grain shrinkage) in the process of thermal treatment of the granules at temperatures above 1400° C, since at such temperatures alumina will be in the viscous flow range.
3. The need of using elevated temperatures (above 1400° C), which involves complicated technology and sophisticated equipment.

Also known in the art is a method for producing granulated porous corundum by thermal treatment of alumina trihydrate at a temperature not lower than 800° C to obtain active alumina, followed by making granules out of a mixture of active alumina and water, hydrolytic hardening of the granules with the formation of pseudo-boehmite and gradual heating of pseudo-boehmite granules and calcinating thereof at a temperature of 1100° to 1300° C.

A disadvantage of the above-described method is that the corundum thus obtained has a heterogeneous structure with a predominant pore size of 1000 to 3000 A, the total pore volume not exceeding 0.35 cm$^3$/g. Thus the prior art method does not permit the production of a granulated porous corundum with the required predominant pore size (5000 to 30000 A) and a total pore volume of more than 0.35 cm$^3$/g.

It is an object of the present invention to provide a method for the production of a granulated porous corundum having a homogeneous pore structure with a total pore volume of 0.3 to 1.0 cm$^3$/g and a predominant pore size of 5000 to 30000 A, which would exclude the sintering of the starting granules and thus prevent the reduction of the total pore volume and linear dimensions of the granules.

Another object of the present invention is to provide a method for the production of a granulated porous corundum having a high mechanical strength.

Still another object of the present invention is to provide a method for the production of a granulated porous corundum, which is technologically less involved and requires no sophisticated machinery.

In accordance with the above and other objects, the invention provides for the thermal treatment of granules of aluminum hydroxide or active alumina having a porous structure with a total pore volume of from 0.3 to 1.0 cm$^3$/g and pore size of from 20 to 5000 A, the thermal treatment being carried out by increasing the temperature from 20° to 700° C during at least half an hour, followed by the thermal treatment of the granules at temperatures ranging from 700° to 1000° C for at least half an hour, and then at temperatures ranging from 1000° to 1400° C for at least half an hour, the thermal treatment within the temperature range of from 20° to 1000° C being carried out in the atmosphere of hydrogen fluoride, which is present in amounts of from 0.01 to 2% of the total weight of active alumina. The process yields granulated porous corundum having a homogeneous porous structure with a total pore volume of from 0.3 to 1.0 cm$^3$/g and a predominant pore size of from 5000 to 30000 A.

We have discovered that the thermal treatment of aluminum hydroxide or active alumina granules, having any pore size distribution within the range of from 20 to 5000 A, in the atmosphpere of hydrogen fluoride, by increasing the temperature from 20° to 700° C, and then at temperatures of from 700° C to 1000° C, results in the production of macroporous corundum granules having a homogeneous porous structure and a large total pore volume. This is due to the fact that the thermal treatment of granules by increasing the temperature from 20° C to 700° C. results in the granules absorbing hydrogen fluoride, whereas in the temperature range of from 700° C to 1000° C hydrogen fluoride is desorbed. This adsorption and desorption of hydrogen fluoride creates the conditions for a more rapid transition of different forms of active alumina into α - Al$_2$O$_3$. All this practically excludes any reduction of the total pore volume and linear dimensions of the starting granules of aluminum hydroxide and active alumina, while the pores having a size under 5000 A in the starting granules become larger as a result of thermal treatment, their size increasing to 5000 to 30000 A. A further thermal treatment of the granules in the temperature range of up to 1400° C renders the granules stronger (crushing strength of the granules thus treated is from 20 to 160 kg/cm$^2$), without practically affecting the total pore volume or the linear dimensions of granules.

The present method can be carried out under stationary thermal conditions wherein the granules of alumina and aluminum hydroxide are first subjected to thermal treatment by increasing the temperature from 20° C to 700° C for a period of at least half an hour, then the granules are subjected to thermal treatment in the temperature range of between 700° C and 1000° C for at least half an hour, the granules being kept at any temperature selected from the above temperature range, thereafter the granules are subjected to thermal treatment in a temperature range of from 1000° C to 1400° C for at least half an hour, the granules being kept at any temperature within the above temperature range, the thermal treatment of granules in the temperature range of from 20° to 700° C and at any temperature within the range of from 700° to 1000° C being carried out in the atmosphere of hydrogen fluoride which is present in amounts of from 0.3 to 2 % of the weight of active alumina.

In case the method according to the present invention is carried out under stationary thermal conditions, it is recommended to carry out the thermal treatment of granules in the temperature range of from 20° C to 700° C by increasing the temperature from said lower limit to said upper limit within a period of 0.5 to 1.0 hour, thereafter increasing the temperature up to 900° C and keeping the granules at this temperature for 1 to 2 hours, and then increasing the temperature to 1400° C and keeping the granules at this temperature for 1 to 2 hours, the thermal treatment of granules in the temperature range of from 20° C to 700° C as well as at a temperature of 900° C being carried out in the atmosphere of hydrogen fluoride which should be present in amounts of from 0.5 to 1% of the weight of active alumina.

In effecting the method according to the present invention under stationary thermal conditions, it is recommended to provide the hydrogen fluoride atmosphere during the process of thermal treatment by first impregnating the granules of alumina or aluminum hydroxide to be heat treated with aqueous solutions of fluorine-containing compounds, such as ammonium fluoride, hydrofluoric acid or metal fluorides, at a temperature of 20° C to 30° C and then drying the granules.

It is also advantageous to provide the hydrogen fluoride atmosphere in the process of thermal treatment by subjecting to thermal treatment granules of alumina or aluminum hydroxide which have been pre-mixed with fluorine-containing compounds such as ammonium fluoride or metal fluorides.

In order to improve the quality (homogeneity) of the granules of porous corundum, reduce hydrogen fluoride consumption and hence the consumption of fluorine-containing compounds, as well as to simplify the technology, it is recommended to carry out the method of the present invention by combining a continuous mode of thermal treatment with the stationary thermal conditions. To this end the granules of active alumina or aluminum hydroxide are subjected to thermal treatment for at least one hour as a bed of granules is continuously moving through a heating furnace, the temperature in the furnace continuously increasing from 20° C to 1000° C in the direction of the bed movement, and in the atmosphere of hydrogen fluoride which is present in amounts of from 0.01 to 0.3% of the weight of active alumina, thereafter the granules are heat-treated at a temperature of from 1000° C to 1400° C for at least half an hour, the granules being kept at any temperature selected from the above temperature range.

In case the method according to the present invention is carried out as a combination of a continuous mode of heat treatment and a heat treatment under stationary conditions it is recommended to subject the granules of active alumina or aluminum hydroxide to thermal treatment in a bed of granules continuously moving through a heating furnace in a temperature range of from 20° C to 1000° C for a period of time from 2 to 6 hours in an atmosphere of hydrogen fluoride which is present in amounts of from 0.01 to 0.05% of the weight of active alumina, thereafter the temperature is to be increased to 1400° C and the granules are to be kept at that temperature for 1 to 2 hours.

The best technological solution of the proposed method is a continuous mode of heat treatment of the granules in the temperature range of from 20° to 1400° C. In this case the thermal treatment of granules of alumina or aluminum hydroxide is carried out for at least 1.5 hours in a bed of granules continuously moving through a heating furnace with the temperature increasing in the direction of the bed movement from 20° C to 1400° C and in the atmosphere of hydrogen fluoride which is present in amounts ranging from 0.01 to 0.3% of the weight of active alumina.

In the continuous mode it is recommended to carry out the heat treatment of granules within a temperature range of from 20° C to 1400° C for a period of 3 to 10 hours in an atmosphere of hydrogen fluoride which is present in amounts of 0.01 to 0.05% of the weight of active alumina.

It is recommended, both in case of combined continuous and stationary modes of heat treatment and in case of a continuous heat treatment only, to create the atmosphere of hydrogen fluoride by subjecting the granules of alumina or aluminum hydroxide, prior to the heat treatment, to impregnation with aqueous solutions of fluorine-containing compounds, such as ammonium fluoride, hydrofluoric acid or metal fluorides at a temperature of from 20° C to 30° C, followed by drying.

In these cases it is advantageous to create the atmosphere of hydrogen fluoride by introducing, simultaneously with the granules of active alumina or aluminum hydroxide, such fluorine-containing compounds, as ammonium fluoride, or metal fluorides.

According to the present method it is recommended to use granulated pseudo-boehmite, boehmite or baierite as the granulated aluminum hydroxide, and granulated $\alpha$ - $Al_2O_3$, $\eta$ -$Al_2O_3$ or $\theta$ -$Al_2O_3$ as granulated active alumina.

The proposed method for producing granulated porous corundum under stationary thermal conditions is carried out as follows.

The initial granules of active alumina or aluminum hydroxide, having a porous structure with a total pore volume of from 0.3 to 1.0 cm$^3$/g and pore size of from 20 to 5000 A, are subjected to heat treatment by increasing the temperature from 20° C to 700° C for at least 0.5 hour, preferably for 0.5 to 1 hour. Then the granules are heat treated at a temperature range of from 700° C to 1000° C for at least 0.5 hour, keeping the granules at any temperature selected from the above temperature range. The granules are preferably kept at a temperature of 900° C for a period of from 1 to 2 hours.

As pointed out above, the thermal treatment of granules, involving increasing the temperature from 20° C to 700° C, as well as at any temperature selected from the temperature range of from 700° C to 1000° C is carried out in an atmosphere of hydrogen fluoride which should be present in amounts of from 0.3 to 2%, preferably in the range of from 0.5 to 1% of the weight of active alumina. The above atmosphere is created by introducing during the process of heat treatment such fluorine-containing compounds as ammonium fluoride, hydrofluoric acid or metal fluorides. Of the above-mentioned compounds the most preferable ones are ammonium fluoride and hydrofluoric acid. Being added to the process, the above compounds will decompose, liberating hydrogen fluoride, or fluorine if metal fluorides are used. In the latter case (when it is fluorine that is liberated), under the conditions of heat treatment, the fluorine and water (which water, as a rule, is contained in the initial granules in amounts not less than 1–4 weight percent) react to form hydrogen fluoride.

As mentioned above, the fluorine-containing compounds are introduced during the process of heat treatment together with the initial granules of active alumina or aluminum hydroxide, by way of performing the following steps:

1. impregnation, prior to the heat treatment, of initial granules with aqueous solutions of ammonium fluoride, hydrofluoric acid or metal fluorides at a temperature of from 20° C to 30° C, followed by drying the impregnated granules;
2. mixing, prior to the heat treatment, of the initial granules with ammonium fluoride or metal fluorides.

In addition to the fluorine-containing compounds indicated earlier, one of the apparent technological possibilities of the method according to the present invention is the use of a gaseous hydrogen fluoride for the purpose of creating the required atmosphere in the process of heat treatment. In this case the thermal treatment of the initial granules in the temperature range of from 20° to 1000° C is carried out by feeding gaseous hydrogen fluoride into the bed of granules.

The thermal treatment of granules in the atmosphere of hydrogen fluoride in the temperature range of from 20° to 1000° C results in the transfer of substantially the whole mass of active alumina into $\alpha$-$Al_2O_3$ and the formation of a porous structure of the corundum granules.

In order to harden the granules and transfer all of the active alumina into $\alpha$-$Al_2O_3$, the thermal treatment of the granules is carried out in the temperature range of from 1000° C to 1400° C for a period of not less than 0.5 hour, keeping the granules at any temperature selected from the above-indicated range. The granules are preferably kept at a temperature of 1400° C for a period of from 1 to 2 hours.

As a result of the above-described thermal treatment, carried out under stationary thermal conditions, there is obtained granulated porous corundum, having a homogeneous porous structure with a total pore volume of from 0.3 to 1.0 $cm^3/g$ and predominant pore size of from 5000 to 30000 A.

As mentioned above, the proposed method can be carried out by combining a continuous mode of heat treatment of granules in the temperature range of from 20° C to 1000° C with heat treatment under stationary thermal conditions at a temperature selected from the temperature range of from 1000° C to 1400° C. In this case the method is preferably carried out as follows.

A heating furnace is continuously charged with initial granules of active alumina or aluminum hydroxide, preimpregnated at a temperature of from 20° C to 30° C with aqueous solutions of fluorine-containing compounds (ammonium fluoride, hydrofluoric acid or metal fluorides) and then dried. In addition to the manner of charging the heating furnace just described, the furnace can be continuously charged with initial granules of active alumina or aluminum hydroxide simultaneously with the introduction of ammonium fluoride, or metal fluorides, or gaseous hydrogen fluoride into the furnace. The bed of granules, continuously advancing through the furnace is gradually heated during a period of at least 1 hour, preferably during 2 to 6 hours, from a starting temperature of 20° C to 1000° C and then discharged from the furnace. The speed of the bed of granules moving through the furnace is easily determined based on the furnace volume and the time required for the granules to be heat treated. The thermal treatment of the granules within the temperature range of from 20° C to 1000° C in the atmosphere of hydrogen fluoride results in the transfer of substantially the whole mass of active alumina into $\alpha$-$Al_2O_3$ and the formation of a porous structure of the corundum granules.

Under the conditions of the thermal treatment in the temperature range of from 20° C to 700° C, described above, the granules adsorb hydrogen fluoride, whereas in the temperature range of from 700° C to 1000° C hydrogen fluoride is desorbed. The desorbed hydrogen fluoride again enters the zone of the temperature range of 20° to 700° C, wherein it is again adsorbed by the granules, whereas in the zone of the temperature range of 700° C to 1000° C it is again desorbed. The adsorption-desorption cycle of hydrogen fluoride is repeated many times. Owing to that the consumption of hydrogen fluoride is reduced to 0.01 to 0.03%, preferably to 0.01 to 0.05% of the weight of active alumina.

After fluorine-containing compounds have been fed into the heating furnace in amounts sufficient for effecting the hydrogen fluoride adsorption-desorption cycle to ensure the production of quality corundum, the feeding of fluorine-containing compounds into the furnace is stopped and only the initial granules of active alumina or aluminum hydroxide are continuously fed into the furnace.

Due to hydrogen fluoride being lost in the process, mainly owing to its entrainment by the exhaust gases from the furnace, these losses have to be made up as needed. This can be achieved either by pre-impregnating the granules of active alumina or aluminum hydroxide with aqueous solutions of fluorine-containing compounds and drying thereof prior to charging the furnace, or by charging the furnace with ammonium fluoride or metal fluorides, or else by feeding a gaseous hydrogen fluoride into the furnace.

After the granules are discharged from the furnace (i.e. after subjecting the granules to heat treatment in the temperature range of from 20° C to 1000° C, they are subjected to hardening. To this end the granules are heat treated in the temperature range of from 1000° C to 1400° C, for at least 0.5 hour keeping them at any temperature selected from the above temperature range. The granules are preferably kept at a temperature of 1400° C for a period of 1 to 2 hours.

The above-described technology, carried out in conjunction with a continuous heat treatment together with the treatment under stationary thermal conditions permits a granulated porous corundum having desired characteristics to be obtained.

In addition to the above-described preferred embodiment of the method according to the present invention wherein a continuous mode of heat treatment is used in conjunction with the treatment under stationary thermal conditions, there exist other embodiments of the method according to the present invention, which are within the scope of the present invention.

As pointed out hereinbefore, the present method can also be effected by carrying out the thermal treatment of the granules of active alumina or aluminum hydroxide in a continuous mode in the temperature range of from 20° C to 1400° C. In this case the thermal treatment of the granules is carried out as a bed of granules is continuously moving through a heating furnace, with the temperature increasing downstream of the bed movement. The heat treatment time under these conditions is at least 1.5 hours, preferably 3 to 10 hours. All other conditions are similar to those inherent to the heat treatment of granules in the temperature range of from 20° C to 1000° C, effected in a continuous mode.

Under the conditions of the thermal treatment described above, which is carried out in a continuous mode in the temperature range of from 20° C to 1400° C, the major portion of the active alumina is converted into $\alpha$-$Al_2O_3$ and a porous structure of the corundum is formed in the temperature range of from 20° C to 1000° C, while the granules are hardened in the temperature range of from 1000° C to 1400° C.

The thermal treatment of granules in a continuous mode permits a more homogeneous and quality reproducible granulated porous corundum to be obtained.

A fuller understanding of the nature and objects of the present invention will be had from the following examples describing the process of producing a granulated porous corundum.

EXAMPLE 1

Spherical granules of $\gamma$-$Al_2O_3$ having substantially 2.5mm diameter, bulk density of 0.76 g/cm$^3$, total pore volume of 0.51 cm$^3$/g, specific surface of 240 m$^2$/g, predominant pore size of 40 A and crushing strength of 60 kg/cm$^2$, were mixed with ammonium fluoride taken in account ensuring the hydrogen fluoride content in the prepared mixture of 2% of the weight of $\gamma$-$Al_2O_3$ The mixture was heated from 20° C to 700° C during a period of 1 hour, thereupon the temperature was increased to 800° C and the granules held at this temperature for 6 hours. The granulated porous product thus obtained comprised about 90 weight percent of $\alpha$-$Al_2O_3$ and about 10 weight percent of $\gamma$-$Al_2O_3$, and had the following characteristics:

| | |
|---|---|
| bulk density | 0.76 g/cm$^3$ |
| total pore volume | 0.54 cm$^3$/g |
| specific surface | 12 m$^2$/g |
| predominant pore size | 5000 A |
| crushing strength | 17 kg/cm$^2$. |

As seen from the above characteristics, the thermal treatment resulted in increased predominant pore size by more than 100-fold, while the total pore volume remained practically unchanged. However, with the mechanical strength of granules reduced by more than a factor of 3.5, the resulting granules cannot be used as a catalyst carrier.

The mechanical strength of the granules and complete conversion of $\gamma$-$Al_2O_3$ into $\alpha$-$Al_2O_3$ was achieved by keeping said granules at a temperature of 1200° C for 2 hours. The heat treatment resulted in a granulated corundum having a homogeneous porous structure, which corundum had the following characteristics:

| | |
|---|---|
| bulk density | 0.76 g/cm$^3$ |
| total pore size | 0.55 cm$^3$/g |
| specific surface | 1 m$^2$/g |
| predominant pore size | 8000 A |
| crushing strength | 50 kg/cm$^2$. |

The size and shape of the corundum granules were similar to those of the initial granules of $\gamma$-$Al_2O_3$.

A control batch of similar granules of $\gamma$-$Al_2O_3$ was heat treated under the same conditions but without the use of ammonium fluoride. The process yielded a granulated porous product, comprising 95 weight percent of $\alpha$-$Al_2O_3$ and 5 weight percent of $\theta$-$Al_2O_3$, having the following characteristics:

| | |
|---|---|
| bulk density | 1.24 g/cm$^3$ |
| total pore size | 0.24 cm$^3$/g |
| specific surface | 4 m$^2$/g |
| predominant pore size | 1250 A |
| crushing strength | 65 kg/cm$^2$. |

Though the mechanical strength of the product thus obtained is rather high, its total pore size is low and the predominant pore size is also below the required range.

EXAMPLE 2

Spherical granules of $\gamma$-$Al_2O_3$, having an average diameter of 2 mm, bulk density of 0.69 g/cm$^3$, total pore volume of 0.55 cm$^3$/g, specific surface of 200 m$^2$/g, predominant pore size of 60 A and crushing strength of 180 kg/cm$^2$, were mixed with ammonium fluoride taken in an amount ensuring the hydrogen fluoride content in the prepared mixture of 0.5 weight percent of $\gamma$-$Al_2O_3$. The mixture was heated from 20° C to 700° C during a period of 0.5 hour, thereupon the temperature was increased to 900° C and the granules held at this temperature for one hour. Then the temperature was increased again to 1400° C and the granules kept at this temperature for 2 hours. The granulated porous corundum thus obtained featured a homogeneous porous structure and had the following characteristics:

| | |
|---|---|
| bulk density | 0.70 g/cm$^3$ |
| total pore volume | 0.6 cm$^3$/g |
| specific surface | 0.7 m$^2$/g |
| predominant pore size | 15000 A |
| crushing strength | 160 kg/cm$^2$. |

The size and shape of the corundum granules were similar to those of the initial granules of $\gamma$-$Al_2O_3$.

EXAMPLE 3

Spherical granules of $\gamma$-$Al_2O_3$ having substantially 3 mm diameter, bulk density of 0.48 g/cm$^3$, total pore volume of 0.95 cm$^3$/g, specific surface of 200 m$^2$/g, predominant pore sizes of 70 and 5000 A and crushing strength of 50 kg/cm$^2$, were mixed with ammonium fluoride taken in amounts ensuring the hydrogen fluoride content in the mixture thus prepared of 0.5 weight percent of $\gamma$-$Al_2O_3$. The mixture was heated from 20° C to 850° C during a period of 0.5 hour, thereupon the temperature was increased to 1300° C and this granules kept at the temperature for 1 hour. The procedure resulted in a granulated corundum with a homogenous porous structure and having the following characteristics:

| | |
|---|---|
| bulk density | 0.50 g/cm$^3$ |
| total pore volume | 0.95 cm$^3$/g |
| specific surface | 0.6 m$^2$/g |
| predominant pore size | 30000 A |
| crushing strength | 20 kg/cm$^2$. |

The size and shape of the corundum granules were similar to those of the initial granules of $\gamma$-$Al_2O_3$.

EXAMPLE 4

Spherical granules of $\gamma$-$Al_2O_3$, having substantially 2.5 mm diameter, bulk density of 0.72 g/cm$^3$, total pore volume of 0.53 cm$^3$/g, specific surface of 200 m$^2$/g, predominant pore size of 80 A and crushing strength of 100 kg/cm², were impregnated with a 1% aqueous solution of hydrofluoric acid at a temperature of 20° C. The granules thus impregnated were dried at a temperature of 100° C. The dried granules contained 0.5% of hydrogen fluoride of the total weight of $\gamma$-Al$_2$O$_3$. Said granules were subjected to heat treatment by increasing the temperature from 20° C to 700° C during 0.5 hour. Further the temperature was increased to 900° C and the granules were kept at that temperature for 2 hours, thereafter the temperature was increased to 1250° C and the granules kept at this temperature for 3 hours. The process resulted in a granulated corundum with a homogeneous porous structure which had the following characteristics:

| | |
|---|---|
| bulk density | 0.73 g/cm³ |
| total pore volume | 0.57 cm³/g |
| specific surface | 1.1 m²/g |
| predominant pore size | 10000 A |
| crushing strength | 70 kg/cm². |

The size and shape of corundum granules were similar to those of the initial granules of $\gamma$-Al$_2$O$_3$.

EXAMPLE 5

Spherical granules of $\gamma$-Al$_2$O$_3$, having the same characteristics as in Example 4, were impregnated with a 3.5% aqueous solution of sodium fluoride at a temperature of 30° C. The granules thus impregnated were dried at a temperature of 100° C. The dried granules contained 1% fluorine based on the weight of $\gamma$-Al$_2$O$_3$. Said granules were subjected to heat treatment by increasing the temperature from 20° C to 700° C during a period of one hour. Thereafter the temperature was further increased to 1000° C and the granules were held at this temperature for 0.5 hour, then the temperature was further increased to 1250° C and the granules were held at this temperature for 4 hours. The process resulted in a granulated corundum with a homogeneous porous structure which had the following characteristics:

| | |
|---|---|
| bulk density | 0.72 g/cm³ |
| total pore volume | 0.58 cm³/g |
| specific surface | 1.1 m²/g |
| predominant pore size | 10000 A |
| crushing strength | 40 kg/cm². |

The size and shape of the corundum granules were similar to those of the initial granules of $\gamma$-Al$_2$O$_3$.

EXAMPLE 6

Granules of $\gamma$-Al$_2$O$_3$ in the form of rings with 4×2×4 mm dimensions, having a bulk density of 0.64 g/cm³, total pore volume of 0.55 cm³/g, a specific surface of 105 m²/g, predominant pore size of 90 A, face-to-face crushing strength of 125 kg/cm² and crushing strength in the lateral direction of 25 kg/cm², were mixed with ammonium fluoride taken in an amount ensuring the hydrogen fluoride content in the prepared mixture of 0.5 weight percent of $\gamma$-Al$_2$O$_3$. The mixture was subjected to heat treatment by increasing the temperature thereof from 20° C to 700° C during a period of 0.5 hour. Then the temperature was further increased to 850° C and the granules were kept at this temperature for 1.5 hours, thereupon the temperature was again increased to 1300° C and the granules kept at this temperature for 2 hours.

The treatment resulted in a granulated corundum having a homogeneous porous structure, which had the following characteristics:

| | |
|---|---|
| bulk density | 0.65 g/cm³ |
| total pore size | 0.57 g cm³/g |
| specific surface | 0.6 m²/g |
| predominant pore size | 10000 A |
| crushing strength | |
| face-to-face | 100 kg/cm² |
| laterally | 20 kg/cm² |

The size and shape of the granules were similar to those of the initial granules of $\gamma$-Al$_2$O$_3$.

EXAMPLE 7

Spherical granules of $\eta$-Al$_2$O$_3$, having substantially 2.5 mm diameter, bulk density of 0.68 g/cm³, total pore volume of 0.58 cm³/g, specific surface of 400 m²/g, predominant pore size of 20 and 60 A, crushing strength of 45 kg/cm², were mixed with ammonium fluoride taken in an amount ensuring the hydrogen fluoride content in the prepared mixture of 1% of the weight of $\eta$-Al$_2$O$_3$. Said mixture was subjected to heat treatment by increasing the temperature thereof from 20° C to 700° C during 0.5 hour. Thereafter the temperature was again increased to 900° C and the granules kept at this temperature for 2 hours, then the temperature was raised again to 1200° C and the granules were kept at this temperature for 4 hours. The process resulted in a granulated corundum with a homogeneous porous structure which had the following characteristics:

| | |
|---|---|
| bulk density | 0.68 g/cm³ |
| total pore weight | 0.63 cm³/g |
| specific surface | 1 m²/g |
| predominant pore size | 16000 A |
| crushing strength | 30 kg/cm² |

The size and shape of the granules were similar to those of the initial granules of $\eta$-Al$_2$O$_3$.

EXAMPLE 8

Spherical granules of $\theta$-Al$_2$O$_3$, having a diameter of 2.5 mm, bulk density of 0.78 g/cm³, total pore volume of 0.5 cm³/g, specific surface of 90 m²/g, predominant pore size of 200 A, and crushing strength of 100 kg/cm², were mixed with ammonium fluoride taken in an amount ensuring the hydrogen fluoride content in the prepared mixture of 1% of the weight of $\theta$-Al$_2$O$_3$. Said mixture was subjected to heat treatment by increasing the temperature thereof from 20° C to 700° C during 0.5 hour. Then the temperature was increased to 950° C and the granules were kept at this temperature for 1 hour, thereafter the temperature was further increased to 1350° C and the granules were kept at this temperature for 0.5 hour. The process resulted in a granulated corundum with a homogeneous porous structure having the following characteristics:

| | |
|---|---|
| bulk density | 0.78 g/cm³ |
| total pore volume | 0.52 cm³/g |
| specific surface | 0.9 m²/g |
| predominant pore size | 10000 A |
| crushing strength | 75 kg/cm² |

The size and shape of the granules were similar to those of the initial granules of $\theta$-Al$_2$O$_3$.

EXAMPLE 9

Spherical granules of pseudo-boehmite, pre-dried to a total moisture content of 20 weight percent, with a diameter of 3 mm, bulk density of 0.85 g/cm$^3$, total pore volume of about 0.5 cm$^3$/g, specific surface of 180 m$^2$/g, predominant pore size of 100 A, and crushing strength of 60 kg/cm$^3$, were mixed with ammonium fluoride taken in an amount ensuring the hydrogen fluoride content in the prepared mixture of 1% of the weight of $\gamma$ -Al$_2$O$_3$. Said mixture was heat treated by increasing the temperature thereof from 20° C to 700° C during 2 hours thereafter the granules were kept at the temperature of 700° C for 4 hours. The temperature was further increased to 1250° C and the granules were kept at this temperature for 2 hours. The process resulted in a granulated corundum with a homogeneous porous structure which had the following characteristics:

| | |
|---|---|
| bulk density | 0.77 g/cm$^3$ |
| total pore volume | 0.55 cm$^3$/g |
| specific surface | 1 m$^2$/g |
| predominant pore size | 10000 A |
| crushing strength | 80 kg/cm$^2$ |

EXAMPLE 10

Spherical granules of boehmite, pre-dried to a total moisture content of 20 weight percent and having a diameter of 3 mm, bulk density of 0.88 g/cm$^3$, total pore volume of about 0.48 cm$^3$/g, specific surface of 170 m$^2$/g, predominant pore size of 100 A and crushing strength of 65 kg/cm$^2$, were mixed with ammonium fluoride, taken in an amount ensuring the hydrogen fluoride content in the prepared mixture of 1 weight percent of $\gamma$ -Al$_2$O$_3$. Said mixture was subjected to heat treatment by increasing the temperature from 20° C to 700° C during 1.5 hours, thereafter the temperature was raised to 850° C and the granules were held at this temperature for 3 hours and then the temperature was again increased to 1200° C and the granules were held at this temperature for 1 hour. The process resulted in a granulated corundum with a homogeneous porous structure, which had the following characteristics:

| | |
|---|---|
| bulk density | 0.78 g/cm$^3$ |
| total pore volume | 0.52 g cm$^3$/g |
| specific surface | 1.5 m$^2$/g |
| predominant pore size | 9000 A |
| crushing strength | 75 kg/cm$^2$ |

EXAMPLE 11

Spherical granules of baierite, pre-dried to a total moisture content of 35 weight percent, having a diameter of 3 mm, bulk density of 0.9 g/cm$^3$, total pore volume of about 0.45 cm$^3$/g, specific surface of 40 m$^2$/g, predominant pore size of 250 A, and crushing strength of 30 kg/cm$^2$, were mixed with ammonium fluoride taken in an amount ensuring the hydrogen fluoride content in the mixture of 1% of the weight of $\eta$ -Al$_2$O$_3$. Said mixture was subjected to heat treatment by increasing the temperature thereof from 20° C to 700° C during a period of 2 hours, thereafter the temperature was again increased to 900° C and the granules kept at this temperature for 2 hours. Then the temperature was further increased to 1300° C and the granules were kept at this temperature for 2 hours. The process resulted in a granulated corundum having a homogeneous porous structure, which had the following characteristics:

| | |
|---|---|
| bulk density | 0.69 g/cm$^3$ |
| total pore volume | 0.62 cm$^3$/g |
| specific surface | 1 m$^2$/g |
| predominant pore size | 15000 A |
| crushing strength | 40 kg/cm$^2$ |

EXAMPLE 12

Spherical granules of $\theta$ -Al$_2$O$_3$, having a diameter of 2 mm, bulk density of 0.92 g/cm$^3$, total pore volume of 0.35 cm$^3$/g, specific surface of 70 m$^2$/g, predominant pore size of 250 A and crushing strength of 100 kg/cm$^2$, were mixed with ammonium fluoride, taken in an amount ensuring the hydrogen fluoride content in the mixture of 2% by weight of the $\theta$ -Al$_2$O$_3$. Said mixture was heated from a temperature of 20° C to 700° C during 1 hour, thereafter the temperature was increased to 800° C and the granules were kept at this temperature for one hour, then the temperature was further increased to 1000° C and the granules were kept at this temperature for 3 hours. The process resulted in a granulated corundum having a homogeneous pore structure, which had the following characteristics:

| | |
|---|---|
| bulk density | 0.92 g/cm$^3$ |
| total pore volume | 0.4 cm$^3$/g |
| specific surface | 1 m$^2$/g |
| predominant pore size | 6000 A |
| crushing strength | 50 kg/cm$^2$ |

The size and shape of corundum granules were similar to those of the initial granules of $\theta$ -Al$_2$O$_3$.

EXAMPLE 13

Spherical granules of $\gamma$ -Al$_2$O$_3$ having a diameter of 2.5 mm, bulk density of 0.80 g/cm$^3$, total pore volume of 0.46 cm$^3$/g, specific surface of 200 m$^2$/g, predominant pore size of 70 A and crushing strength of 80 kg/cm$^2$, were impregnated with a 1.5% aqueous solution of ammonium fluoride at a temperature of 20° C. The granules thus impregnated were dried at a temperature of 90° C. The dried granules contained 0.3% hydrogen fluoride of the weight of $\gamma$ -Al$_2$O$_3$. Said granules were subjected to heat treatment by increasing the temperature thereof from 20° C to 700° C during 0.5 hour. The temperature was thereafter increased to 950° C and the granules kept at this temperature during 1 hour; thereupon the temperature was again increased to 1300° C and the granules kept at this temperature for 2 hours. The process resulted in a granulated corundum having a homogeneous porous structure with the following characteristics:

| | |
|---|---|
| bulk density | 0.66 g/cm$^3$ |
| total pore volume | 0.35 cm$^3$/g |
| specific surface | 1.5 m$^2$/g |
| predominant pore size | 8000 A |
| crushing strength | 65 kg/cm$^2$ |

EXAMPLE 14

Spherical granules of $\gamma$ -Al$_2$O$_3$ having a diameter of 2.5 mm bulk density of 0.72 g/cm$^3$, total pore volume of 0.53 cm$^3$/g, specific surface of 200 m$^2$/g, predominant pore size of 80 A, and crushing strength of 100 kg/cm², were charged into a vertical tubular furnace (inner diameter of furnace tube — 52 mm, height of heated portion of the tube — 1 m). The furnace filled with the granules, a thermal field was created therein, being uniformly distributed in the layer of granules throughout the height of the furnace within a temperature range of from 20° C to 1000° C, the temperature increasing towards the discharge end of the furnace. As the required temperature range in the furnace was reached, a discharge mechanism was actuated and simultaneously 2 g of ammonium fluoride powder was introduced into the furnace, also initial granules of $\gamma$-Al$_2$O$_3$ were continuously charged into the furnace. The granules were discharged from the furnace at a rate of about 350 cm³/hr. The granule residence time in the furnace in the temperature range of from 20° C to 1000° C was five hours. Every 5 hours a portion of about 5 g of ammonium fluoride was introduced into the furnace.

The furnace was operated in a continuous mode for 300 hours. During this time, 75 kg of a granulated porous product were obtained. The ammonium fluoride consumption calculated as hydrogen fluoride was 0.02% of the weight of $\gamma$-Al$_2$O$_3$.

After being discharged from the furnace, the product was kept at a temperature of 1400° C for 0.5 hour. The process yielded granulated corundum having a homogeneous porous structure and the following characteristics:

| | |
|---|---|
| bulk density | 0.73 g/cm³ |
| total pore volume | 0.57 cm³/g |
| specific surface | 0.8 m²/g |
| predominant pore size | 10000 A |
| crushing strength | 75 kg/cm². |

The size and shape of the corundum granules were similar to those of the initial granules of $\gamma$-Al$_2$O$_3$.

EXAMPLE 15

Spherical granules of $\gamma$-Al$_2$O$_3$, having the same characteristics as in Example 14, were subjected to heat treatment in the temperature range of from 20° C to 1000° C, carried out under the conditions similar to those in Example 14, the only difference being that the granule discharge rate from the furnace was about 300 cm³/hr., whereas the granule residence time in the furnace in the temperature range of from 20° C to 1000° C was 6 hours, ammonium fluoride being added in portions of about 0.2 g into the furnace every 6 hours.

The furnace was continuously operated for 150 hours, yielding 35 kg of a granulated porous product. The consumption of ammonium fluoride calculated as hydrogen fluoride was 0.01% of the weight of $\gamma$-Al$_2$O$_3$.

After being discharged from the furnace, the granulated product was kept at a temperature of 1300° C for 1 hour. The resulting product was granulated corundum with a homogeneous porous structure which had the same characteristics as the corundum in Example 14.

EXAMPLE 16

Spherical granules of $\eta$-Al$_2$O$_3$, having a diameter of 2.5 mm, bulk density of 0.68 g/cm³, total pore volume of 0.58 cm³/g, specific surface of 400 m²/g, predominant pore size of 20 and 60 A, crushing strength of 45 kg/cm², were impregnated with an aqueous solution of hydrofluoric acid at a temperature of 20° C.

The impregnated granules were dried at a temperature of 100° C. Dry granules contained 0.3% of hydrogen fluoride based on the weight of $\eta$-Al$_2$O$_3$. These granules were charged into a vertical tubular furnace (inner diameter of furnace tube — 30 mm, height of heated portion of tube — 0.75 m). The furnace filled with the granules, a thermal field was created therein, being uniformly distributed in the layer of granules throughout the height of the furnace within a temperature range of from 20° C to 1000° C, the temperature increasing towards the discharge end of the furnace. As the required temperature range in the furnace was reached, a discharge mechanism was actuated and simultaneously similar granules of $\eta$-Al$_2$O$_3$, containing 0.3% of hydrogen fluoride, were continuously charged into the furnace. The granules were discharged from the furnace at a rate of about 500 cm³/hr. The granule residence time in the furnace in the temperature range of from 20° C to 1000° C was 1 hour.

The furnace was continuously operated for 100 hours, yielding 35 kg of a granulated porous product. The hydrofluoric acid consumption, calculated as hydrogen fluoride, was 0.3% of the weight of $\eta$-Al$_2$O$_3$.

After being discharged from the furnace the granulated product was kept at a temperature of 1400° C for 2 hours. The process yielded a granulated corundum having a homogeneous porous structure which had the following characteristics:

| | |
|---|---|
| bulk density | 0.69 g/cm³ |
| total pore volume | 0.62 cm³/g |
| specific surface | 1 m²/g |
| predominant pore size | 15000 A |
| crushing strength | 35 kg/cm² |

The shape and size of the corundum granules were similar to those of the initial granules of $\eta$-Al$_2$O$_3$.

EXAMPLE 17

Spherical granules of $\gamma$-Al$_2$O$_3$, having a diameter of 2.5 mm, bulk density of 0.72 g/cm³, total pore volume of 0.53 cm³/g, specific surface of 200 m²/g, predominant pore size of 80 A and crushing strength of 100 kg/cm², were charged into a vertical tubular furnace (inner diameter of furnace tube — 30 mm, height of heated portion of tube — 0.75 m). The furnace filled with the granules, a thermal field was created therein, being uniformly distributed in the layer of granules throughout the height of the furnace within a temperature range of from 20° C to 1000° C, the temperature increasing towards the discharge end of the furnace. As the required temperature range in the furnace was reached, a discharge mechanism was actuated and simultaneously a portion of 1 g ammonium fluoride powder was introduced into the furnace, also the initial granules of $\gamma$-Al$_2$O$_3$ were continuously charged into the furnace. The granules were discharged from the furnace at a rate of about 250 cm³/hr. The granule residence time in the furnace in the temperature range of from 20° C to 1000° C was 2 hours. Every 3 hours the furnace was charged with ammonium fluoride in portions of about 0.5 g each time.

The furnace was continuously operated for 100 hours, yielding 18 kg of a granulated porous product. The consumption of ammonium fluoride, calculated as hydrogen fluoride, was 0.05% of the weight of $\gamma$-Al$_2$O$_3$.

After being discharged from the furnace the granulated product was kept at a temperature of 1000° C for 5 hours. The resulting product was granulated corundum with a homogeneous porous structure which had the following characteristics:

| | |
|---|---|
| bulk density | 0.73 g/cm³ |
| total pore volume | 0.57 cm³/g |
| specific surface | 1 m²/g |
| predominant pore size | 8000 A |
| crushing strength | 40 kg/cm² |

The shape and size of the corundum granules were similar to those of the initial gaanules of $\gamma$ -$Al_2O_3$.

EXAMPLE 18

Spherical granules of $\gamma$ -$Al_2O_3$, having the same characteristics as in Example 17, were charged into a vertical tubular furnace (inner diameter of tube — 52 mm, height of heated portion of tube — 1.5 m). The furnace filled with the granules, a thermal field was created therein, being uniformly distributed in the layer of granules throughout the height of the furnace within a temperature range of from 20° C to 1400° C, the temperature increasing towards the discharge end of the furnace. As the required temperature range was reached, a discharge mechanism was actuated and simultaneously 2 g of ammonium fluoride powder was introduced into the furnace. At the same time, initial granules of $\gamma$ -$Al_2O_3$ were continuously charged into the furnace. The granules were discharged from the furnace at a rate of about 320 cm³/hr. The granule residence time in the furnace in the temperature range of from 20° C to 1400° C was 9 hours. Every 6 hours, a portion of about 0.5 g of ammonium fluoride was charged into the furnace.

The furnace operated in a continuous mode for 240 hours, yielding 55 kg of a granulated corundum having a homogeneous porous structure. The consumption of ammonium fluoride, calculated as hydrogen fluoride, was 0.02% of the weight of $\gamma$ -$Al_2O_3$. The granulated porous corundum thus produced had the following characteristics:

| | |
|---|---|
| bulk density | 0.74 g/cm³ |
| total pore volume | 0.56 cm³/g |
| specific surface | 0.7 m²/g |
| predominant pore size | 1000 A |
| crushing strength | 80 kg/cm² |

The shape and size of the corundum granules were similar to those of the initial granules of $\gamma$ -$Al_2O_3$.

EXAMPLE 19

Spherical granules of $\gamma$ -$Al_2O_3$, having the same characteristics as in Example 17, were charged into a vertical tubular furnace (inner diameter of tube — 52 mm, height of heated portion of tube — 1.5 m). The furnace filled with the granules, a thermal field was created therein, being uniformly distributed in the layer of granules throughout the height of the furnace within a temperature range of from 20° C to 1400° C, the temperature increasing towards the discharge end of the furnace. As the required temperature range was reached, a discharge mechanism was actuated and simultaneously 1 g of ammonium fluoride powder was introduced into the furnace, the latter being continuously charged with the initial granules of $\gamma$ -$Al_2O_3$. The granules were discharged from the furnace at a rate of about 300 cm³/hr. The granule residence time in the furnace in the temperature range of from 20° C to 1400° C was 10 hours. Every 10 hours, a portion of about 0.35 g of ammonium fluoride was charged into the furnace.

The furnace operated in a continuous mode for 120 hours, yielding 25 kg of a granulated corundum having a homogeneous porous structure. The consumption of ammonium fluoride, calculated as hydrogen fluoride, was 0.01% of the weight of $\gamma$ -$Al_2O_3$. The granulated porous corundum had the following characteristics:

| | |
|---|---|
| bulk density | 0.74 g/cm³ |
| total pore volume | 0.56 cm³/g |
| specific surface | 0.8 m²/g |
| predominant pore size | 10000 A |
| crushing strength | 80 kg/cm² |

The shape and size of the corundum granules were similar to those of the initial granules of $\gamma$ -$Al_2O_3$.

EXAMPLE 20

Spherical granules of $\eta$ -$Al_2O_3$, having a diameter of 2.5 mm, bulk density of 0.68 g/cm³, total pore volume of 0.58 cm³/g, specific surface of 400 m²/g, predominant pore size of 20 and 60 A, crushing strength of 45 kg/cm², were impregnated with a 0.5% aqueous solution of hydrofluoric acid at a temperature of 20° C. The impregnated granules were dried at a temperature of 100° C. Dry granules contained 0.3% of hydrogen fluoride based on the weight of $\eta$ -$Al_2O_3$. The granules were charged into a vertical tubular furnace (inner diameter of tube — 30 mm, height of heated portion of tube — 1.15 m). The furnace filled with the granules, a thermal field was created therein, being uniformly distributed in the layer of granules throughout the height of the furnace within the temperature range of from 20° C to 1400° C, the temperature increasing towards the discharge end of the furnace. As the required temperature range was reached, a discharge mechanism was actuated and simultaneously initial granules of $\eta$ -$Al_2O_3$ having 0.3% hydrogen fluoride content, were continuously charged into the furnace. The granules were discharged from the furnace at a rate of about 500 cm³/hr. The granule residence time in the furnace in the temperature range of from 20° C to 1400° C was 1.5 hours.

The furnace was operated continuously for 100 hours, yielding 35 kg of a granulated corundum having a homogeneous porous structure. The consumption of hydrofluoric acid, calculated as hydrogen fluoride, was 0.3% of the weight of $\eta$ -$Al_2O_3$. The granulated porous corundum thus obtained had the following characteristics:

| | |
|---|---|
| bulk density | 0.69 g/cm³ |
| total pore size | 0.62 cm³/g |
| specific surface | 1 m²/g |
| predominant pore size | 15000 A |
| crushing strength | 30 kg/cm² |

The shape and size of the corundum granules were similar to those of the initial granules of $\eta$ -$Al_2O_3$.

EXAMPLE 21

Spherical granules of $\gamma$ -$Al_2O_3$, having the same characteristics as in Example 17, were charged into a vertical tubular furnace (inner diameter of furnace tube — 30 mm, height of heated portion of tube — 1.15 m). The furnace filled with the granules, a thermal field was created therein, being uniformly distributed in the layer of granules throughout the height of the furnace within the temperature range of from 20° C to 1400° C, the temperature increasing towards the discharge end of the furnace. As the required temperature range was reached, a discharge mechanism was actuated and simultaneously 1 g of ammonium fluoride powder was introduced into the furnace and the initial granules of $\gamma$-$Al_2O_3$ were continuously charged into the furnace. The granules were discharged from the furnace at a rate of about 250 cm³/hr. The granule residence time in the furnace in the temperature range of from 20° C to 1400° C was 3 hours. Every 3 hours a portion of about 0.5 g of ammonium fluoride was introduced into the furnace.

The furnace was operated in a continuous mode for 100 hours, yielding 18 kg of granulated corundum having a homogeneous porous structure. The consumption of ammonium fluoride calculated as hydrogen fluoride as 0.05 percent of the weight of $\gamma$-$Al_2O_3$.

The granulated porous corundum had the following characteristics:

| | |
|---|---|
| bulk density | 0.73 g/cm³ |
| total pore volume | 0.57 cm³/g |
| specific surface | 0.9 m²/g |
| predominant pore size | 10000 A |
| crushing strength | 50 kg/cm². |

The shape and size of the corundum granules were similar to those of the initial granules of $\gamma$-$Al_2O_3$.

What is claimed is:

1. A method for producing granulated porous corundum having a homogeneous porous structure with a total pore volume of from 0.3 to 1.0 cm³/g and a predominant pore size of 5000 to 30000 A, comprising subjecting granules of a compound selected from the group consisting of active alumina and aluminum hydroxide to heat treatment by increasing the temperature from 20° C to 700° C for at least 0.5 hour; said initial granules of active alumina or aluminum hydroxide having a total pore volume of from 0.3 to 1.0 cm³/g and a pore size of from 20 to 5000 A; further heat treating said granules in the temperature range of from 700° C to 1000° C for at least 0.5 hour, and then in the temperature range of from 1000° C to 1400° C for at least 0.5 hour, the heat treatment in the temperature range of from 20° C to 1000° C being essential to be carried out in an atmosphere of hydrogen fluoride which is present in an amount of from 0.01 to 2.0 percent of the weight of active alumina.

2. A method as claimed in claim 1, wherein the thermal treatment of granules in the temperature range of from 700° C to 1000° C is carried out by keeping said granules at any temperature selected from said temperature range, whereas the step of heat treating said granules in a temperature range of from 1000° C to 1400° C is carried out by keeping said granules at any temperature selected from said second temperature range, the heat treatment of said granules within the temperature range of from 20° C to 700° C as well as at any temperature within the the temperature range of from 700° C to 1000° C being carried out in an atmosphere of hydrogen fluoride which is present in an amount of from 0.3 to 2.0 percent of the weight of active alumina.

3. A method as claimed in claim 2, wherein the granules are subjected to heat treatment in the temperature range of from 20° C to 700° C by increasing the temperature from said lower lever to said upper level within a period of time from 0.5 to 1.0 hour, thereafter the temperature is increased to 900° C and the granules are kept at 900° C for 1 to 2 hours, then the temperature is increased to 1400° C and the granules are kept at 1400° C for 1 to 2 hours, the heat treatment of said granules in the temperature range of from 20° C to 700° C and at 900° C being carried out in an atmosphere of hydrogen fluoride which is present in an amount of from 0.5 to 1.0 percent of the weight of active alumina.

4. A method as claimed in claim 2, wherein the atmosphere of hydrogen fluoride is created in the process of heat treatment by subjecting to said heat treatment granules that have been pre-impregnated at a temperature of from 20° C to 30° C with an aqueous solutions of a fluorine-containing compound and dried, said fluorine-containing compound being selected from the group consisting of ammonium fluoride, hydrofluoric acid and metal fluorides.

5. A method as claimed in claim 2, wherein the atmosphere of hydrogen fluoride is created in the process of heat treatment by subjecting to the heat treatment granules which have been pre-mixed with a fluorine-containing compound selected from the group consisting of ammonium fluoride and metal fluorides.

6. A method as claimed in claim 1, wherein the granules are subjected to heat treatment as a layer of said granules continuously moving through a heating furnace, the temperature in said furnace increasing from 20° C to 1000° C in the direction of movement of said layer of granules, in an atmosphere of hydrogen fluoride which is present in an amount of from 0.01 to 0.3 percent of the weight of active alumina, thereafter said granules are heat treated within the temperature range of from 1000° C to 1400° C by keeping the granules at any temperature selected from said temperature range.

7. A method as claimed in claim 6, wherein a layer of said granules, continuously moving through a heating furnace, is subjected to heat treatment for 2 to 6 hours within the temperature range of from 20° C to 1000° C, in an atmosphere of hydrogen fluoride which is present in an amount of from 0.01 to 0.05 percent of the weight of active alumina, thereafter the temperature is increased to 1400° C and said granules are kept at 1400° C for a period of from 1 to 2 hours.

8. A method as claimed in claim 6, wherein the atmosphere of hydrogen fluoride is created in the process of heat treatment by subjecting to the heat treatment granules which have been pre-impregnated at a temperature of from 20° C to 30° C with an aqueous solution of a fluorine-containing compound and dried, said fluorine-containing compound being selected from the group consisting of ammonium fluoride, hydrofluoric acid and metal fluorides.

9. A method as claimed in claim 6, wherein the atmosphere of hydrogen fluoride is created in the process of heat treatment by introducing into the heating furnace a fluorine-containing compound selected from the group consisting of ammonium fluroide, and metal fluorides simultaneously with the introduction of said granules.

10. A method as claimed in claim 1, wherein said granules are subjected to heat treatment as a layer of said granules continuously moving through a heating furnace with the furnace temperature increasing in the direction of the movement of said layer of grains from 20° C to 1400° C, in an atmosphere of hydrogen fluoride which is present in an amount of from 0.01 to 0.3 percent of the weight of active alumina.

11. A method as claimed in claim 10, wherein the heat treatment of granules within the temperature range of from 20° C to 1400° C is carried out for a period of from 3 to 10 hours in an atmosphere of hydrogen fluoride which is present in an amount of from 0.01 to 0.05 percent of the weight of active alumina.

12. A method as claimed in claim 10, wherein the atmosphere of hydrogen fluoride is created in the process of heat treatment by subjecting to the heat treatment granules that have been pre-impregnated at a temperature of from 20° C to 30° C with an aqueous solution of a fluorine-containing compound and dried, said fluorine-containing compound being selected from the group consisting of ammonium fluoride, hydrofluoric acid and metal fluorides.

13. A method as claimed in claim 10, wherein the atmosphere of hydrogen fluoride is created in the process of heat treatment by introducing, simultaneously with said granules, fluorine-containing compounds selected from the group consisting of ammonium fluoride and metal fluorides.

14. A method as claimed in claim 1, wherein the granulated aluminum hydroxide is selected from the group consisting of pseudoboehmite, boehmite and baierite.

15. A method as claimed in claim 1, wherein the granulated active alumina is selected from the group consisting of $\gamma$-$Al_2O_3$, $\eta$-$Al_2O_3$, $\theta$-$Al_2O_3$.

* * * * *